United States Patent [19]

Tomoshige et al.

[11] 3,718,635

[45] Feb. 27, 1973

[54] PROCESS FOR POLYMERIZATION OF OLEFINS AND CATALYST COMPOSITION THEREFOR

[75] Inventors: Toru Tomoshige, Iwakuni; Shiro Honma, Otake, both of Japan

[73] Assignee: Mitsui Petrochemical Industries, Ltd., Tokyo, Japan

[22] Filed: Dec. 14, 1970

[21] Appl. No.: 98,197

[30] Foreign Application Priority Data

Dec. 16, 1969 Japan..........................44/100605

[52] U.S. Cl. .........260/93.7, 252/429 C, 260/88.2 R, 260/94.9 DA, 260/94.9 E
[51] Int. Cl. ............................C08f 1/56, C08f 3/10
[58] Field of Search..........260/93.7, 94.9 DA, 94.9 E

[56] References Cited

UNITED STATES PATENTS

| | | | |
|---|---|---|---|
| 3,072,628 | 1/1963 | Coover et al. | 260/93.7 |
| 3,483,269 | 12/1969 | Magoon et al. | 260/683.15 |
| 3,168,484 | 2/1965 | Engel et al. | 260/94.9 |
| 3,594,330 | 7/1971 | Delbouille et al. | 260/94.9 |

FOREIGN PATENTS OR APPLICATIONS

| | | |
|---|---|---|
| 1,560,602 | 2/1969 | France |
| 601,919 | 7/1960 | Canada |

*Primary Examiner*—Harry Wong, Jr.
*Assistant Examiner*—Edward J. Smith
*Attorney*—Sherman and Shalloway

[57] ABSTRACT

A process for polymerizing $\alpha$-olefins in the presence of a Ziegler catalyst, such catalyst comprising (i) a pulverulent catalyst component obtained by mechanically or physically copulverizing a halogen compound of low valency titanium obtained by reducing titanium tetrahalide with a member selected from the group consisting of hydrogen, metallic aluminum and metallic titanium, an oxide selected from the group consisting of (a) an oxide selected from the group consisting of MgO, $Al_2O_3$ and $SiO_2$ and (b) a compound oxide containing at least two elements selected from the group consisting of Mg, Al and Si, in an inert atmosphere in the solid phase until the average particle size of the pulverized product reaches 5 microns or less; and (ii) an organoaluminum or organozinc compound.

8 Claims, No Drawings

PROCESS FOR POLYMERIZATION OF OLEFINS AND CATALYST COMPOSITION THEREFOR

This invention relates to an improved process for polymerization of olefins and a catalyst composition for use in the process. More specifically, the invention relates to an improved process for polymerizing or copolymerizing α-olefins having three to eight carbon atoms or copolymerizing such olefin with ethylene with improved isotacticity and specific polymerization activity (the yield in grams of polymer per milligram-atom of titanium atom per hour and per atmospheric pressure: g/mg-atom.hr.atm.), and to an improved catalyst composition for use in the practice of this process.

It has been known to polymerize or copolymerize α-olefins in an inert solvent in the presence of a Ziegler catalyst comprising a halogen compound of low valency titanium and an organoaluminum or organozinc compound.

The present invention is an improvement of such process for polymerizing α-olefins with an improved catalyst composition comprising i. a pulverulent catalyst component obtained by mechanically copulverizing a halogen compound of low valency titanium obtained by reducing titanium tetrahalide with a member selected from the group consisting of hydrogen, metallic aluminum and metallic titanium, and at least one oxide selected from the group consisting of (a) an oxide selected from the group consisting of MgO, $Al_2O_3$ and $SiO_2$ and (b) compound oxides containing at least two elements, selected from the group consisting of Mg, Al and Si, in an inert atmosphere in the solid phase until the average particle size of the pulverized product reaches 5 µ or less, and ii. an organoaluminum or organozinc compound.

Some proposals have been known to utilize an inert carrier in the polymerization or copolymerization of olefins using Ziegler catalysts.

British Patent specification No. 815,805 discloses an improved process for polymerizing an α-olefin, which comprises contacting a gas comprising the α-olefin with finely divided solid particles comprising a Ziegler catalyst and an inert solid carrier material in the substantial absence of a liquid solvent or diluent. The British patent cites such inert solid carriers as finely divided silica, titanium oxide, clays in anhydrous pulverulent or granular form such as diatomaceous earth, finely divided asbestos and glass fibers, sodium chloride, sodium sulfate, calcium carbonate, calcium oxide, finely divided solid particles of the polymer such as polystyrene, which is different from the polymer to be polymerized thereon. It is described that when the organo-metal composition is solid, the solid organo-metal composition can be admixed in finely divided form with the silica particles and blended therewith, for example, by mechanical agitation or grinding.

This British specification, however, is quite silent with respect to the grinding of the solid halogen compound of low valency titanium and the solid carrier in the solid phase, the extent of such grinding, the usability of the resulting catalyst comprising the titanium component and the organo-metallic compound ground in the solid phase for the polymerization of olefins in an inert solvent and in liquid phase, and the superiority of using such catalyst. The patent only gives an experimental example in which ethylene was polymerized in the absence of a polymerization solvent using a catalyst obtained by admixing triisobutyl aluminum dissolved in liquid pentane and titanium tetrachloride dissolved in liquid pentane with diatomaceous earth, sodium chloride or polystyrene in finely ground and dry form and thereafter completely evaporating pentane.

In the present invention, the solid halogen compound of low valency titanium and a solid carrier should be copulverized in the solid phase and to the extent such that the average particle size of the pulverized product is diminished to 5 µ or less. The objects of the present invention cannot be achieved if a catalyst composition prepared under the copulverizing conditions outside those specified above is used. Furthermore, the use of a mixture of an average particle size of 5 µ or less consisting of separately pulverized solid halogen compound of low valency titanium and solid carrier or the use of a catalyst composition prepared in the absence of a carrier cannot lead to the achievement of the objectives of the present invention. These will be demonstrated in Comparative Examples which will appear later in the specification.

Accordingly, the present invention can be distinguished from British Pat. No. 815,805 in that the invention consists essentially of copulverizing the particles until the specific particle sizes are attained, which is not referred to the British patent specification, and that the polymerization of the invention is limited to one in the presence of a sufficient amount of an inert solvent or liquid α-olefin, preferably liquid propylene, whereas the British Patent, to one in the absence of an inert polymerization solvent or in the presence of a very small amount of it.

British pat. specification Nos. 907,579 and 910,261 disclose the production of a rubbery polymer or copolymer having an atactic structure and a low crystallinity in which a Ziegler catalyst in finely divided state is admixed with one or more inert, solid diluents, preferably to form a fluidized bed, and an olefinically unsaturated hydrocarbon is polymerized in the gas phase and in the absence of a liquid phase. The patents exemplify such solid diluents as silica gel, kieselguhr, alumina, metal oxides such as calcium oxide or magnesium oxide, and salts such as calcium carbonate.

These two British patents do not disclose nor suggest the copulverization of a solid halogen compound of low valency titanium and a solid carrier in the solid phase, the extent of the copulverization, the usability of the resulting catalyst comprising titanium component ground in the solid phase and the organo-metal compound for the polymerization of olefins in an inert solvent or in liquid phase, and the superiority of using such catalyst. Moreover, the product is a rubbery atactic polymer having substantially no isotacticity.

U. S. Pat. No. 3,166,542 proposes a process for polymerizing olefins using a catalyst comprising a transition metal compound and an organo-metallic compound, the transition metal compound being prepared by reacting a halogen compound of a transition metal of Groups 4A to 6A of the periodic table with a pulverulent inorganic solid having a hydroxyl group on the surface such as magnesium oxide is directed aluminum oxide or silicon oxide in a substantially anhydrous condition at 105°C. or below while removing a gas formed the by-product during the reaction, thereby to chemically fix the halogen compound of the transition metal onto the surface of the inorganic solid.

The U. S. patent, however, only gives an example of liquid-phase reaction to fix the halogen compound of the transition metal chemically onto the inorganic solid, and generally discloses no solid-phase reaction. In other words, this patent illustrates only the use of solution on liquid halogen compounds of transition metals, and only teaches the use of a titanium component prepared by bonding a halogen compound of a liquid or gaseous transition metal chemically onto a pulverulent inorganic solid having an average particle size of less than 1 $\mu$. There is no disclosure or suggestion as to the use of a titanium component obtained by copulverization of a solid titanium compound and a solid carrier in the solid phase.

The results illustrated hereinafter show, as described of the first proposal, that the object of the present invention cannot be achieved if a carrier pulverized previously is admixed with a titanium compound pulverized alone.

Belgian Pat. No. 705,220 proposes a process for polymerizing $\alpha$-olefins using a catalyst comprising a complex and an organometallic compound, the complex being prepared by reacting a halogen derivative of a transition metal of Groups 4A to 6A of the Periodic Table with an oxide of a divalent metal in the absence of a diluent and in an anhydrous condition with small amounts of hydroxyl groups. This process, however, does not prove useful for polymerizing $\alpha$-olefins to highly crystalline polymers, because the liquid halogen derivative of the transition metal is employed, and the chemical bonding of the halogen derivative to the oxide carrier is performed in the liquid phase different from the solid phase in the invention.

It has now been found that polymers or copolymers of $\alpha$-olefins having three to eight carbon atoms or copolymers of such $\alpha$-olefins with ethylene with high isotacticity are produced with good specific polymerization activity using an organo-aluminum or organo-zinc compound and a titanium component obtained by copulverizing a solid halogen compound of low valency titanium and at least one solid oxide selected from the group consisting of (a) an oxide selected from MgO, $Al_2O_3$ and $SiO_2$ and (b) compound oxide containing at least two elements selected from the group consisting of Mg, Al and Si, in the solid phase to the specified particle size.

A primary object of this invention is to a process for producing homo- or co-polymers of $C_3$–$C_8$ $\alpha$-olefins or copolymers of such $\alpha$-olefins with ethylene having improved isotacticity with improved specific polymerization activity using a catalyst comprising the organoaluminum or organozinc compound and the titanium component which can be obtained by simple means of good reproducibility.

Another object of the invention is to provide a catalyst composition which is easy to prepare and is suitable for the production of homo- or co-polymers of $C_3$–$C_8$ $\alpha$-olefins having improved isotacticity and with improved specific polymerization activity.

Many other objects and advantages of the invention will become apparent from the following description.

The pulverulent titanium component used in the invention is obtained by mechanically or physically copulverizing a halogen compound of low valency titanium obtained by reducing titanium tetrahalide with a member selected from the group consisting of hydrogen, metallic aluminum and metallic titanium and at least one oxide selected from the group consisting of (a) an oxide selected from the group consisting of MgO, $Al_2O_3$ and $SiO_2$ and (b) compound oxides containing at least two elements selected from the group consisting of Mg, Al and Si in the solid phase in an inert atmosphere until the average particle size of the pulverized product reaches 5 $\mu$ or less.

Optical microscopic photographs of the pulverized product indicate that this solid-phase copulverization can readily lead to a reduction in average particle size of the oxide selected from MgO, $Al_2O_3$ and $SiO_2$ and/or compound oxides containing at least two of Mg, Al and Si.

As the halogen compound of low valency titanium, trivalent titanium compound obtained by reducing titanium tetrachloride with an organometallic compound such as an organoaluminum compound did not produce good results.

The mechanism of improving the activity of a halogen compound of low valency titanium is not clear, but it is assumed that there is some other important factor than the effect of mere copulverization, since it has been confirmed, as previously stated, that the objects of the present invention cannot be achieved when a pulverulent mixture of separately pulverized halogen compound of low valency titanium and inorganic oxide selected from magnesia, alumina and silica and/or compound oxides containing at least two of Mg, Al and Si is used.

The inorganic oxide selected from MgO, $Al_2O_3$ and $SiO_2$ and/or compound oxides containing at least two of Mg, Al and Si is preferably deprived of water by drying or calcination. More preferably from the viewpoint of increasing the yield of polymer per unit weight of titanium atom, the inorganic oxide, prior to use, is treated with an organic compound of a metal of Groups 2 to 3 of the Periodic Table, preferably an organoaluminum or organozinc compound in an inert hydrocarbon solvent such as hexane maintained at 0° to 150°C., washed with an inert hydrocarbon solvent such as hexane, and then dried.

Such pretreatment is performed by contacting the inorganic oxide with the organometallic compound in an inert hydrocarbon solvent such as saturated aliphatic hydrocarbons having five to 16 carbon atoms, for instance, pentane, hexane, heptane, kerosene and cyclohexane, usually at a temperature of 0° to 140°C. for a period of time from 0.5 to 4 hours. If desired, the contacting is effected with stirring. As the organometallic compound suitable for such pre-treatment, the following can be cited, for example, trialkyl aluminums having an alkyl group with one to six carbon atoms, dialkyl aluminum halides having an alkyl group with one to six carbon atoms, alkyl aluminum dihalides having an alkyl group with one to six carbon atoms, alkyl aluminum sesquihalides having an alkyl group with one to six carbon atoms, and dialkylzincs having an alkyl group with one to four carbon atoms. Specific examples include triethyl aluminum, tributyl aluminum, triisobutyl aluminum, trihexyl aluminum, diethyl aluminum chloride, diethyl aluminum bromide, ethyl aluminum sesquichloride, ethyl aluminum dichloride, diethylzinc, and dibutylzinc.

In the co-pulverization treatment of the invention, the amount of the halogen compound of low valency titanium is preferably in the range of 0.1 to 2.0 millimols per gram of the oxide.

Any means for effecting the copulverization in the solid phase can be used which is capable of pulverizing the solid mixture to an average particle size of 5 $\mu$ or less, preferably to such a size that at least 80 percent by weight of the total particles have a particle size of 5 $\mu$ or below. Usually, the average particle size of the pulverized product is in the range of 0.1 to 5 $\mu$.

The copulverization may be effected by means of a vibratory ball mill, rotary ball mill, tube mill, disc-type vibratory mill, and jet impact pulverizer. Pulverization with a ball mill is most popular, and desirable. There is no particular restriction on the copulverization temperature, but usually from room temperature to 130°C., preferably from room temperature to 60°C. The pulverizing time is chosen depending upon the method of pulverization and the material to be pulverized, but in short, the copulverization may be continued until the average particle size of the magnesium oxide, aluminum oxide or silicon oxide and/or compound oxides containing at least two of Mg, Al and Si reaches 5 $\mu$ or less. For this purpose, the pulverization time is usually from 5 to 50 hours. The effect of copulverization is observed even if the average particle size does not reach the above-specified value, but such is not sufficient.

The copulverization and the washing, recovery and transportation, etc. of the copulverized product are usually and preferably carried out in a substantially anhydrous condition in an atmosphere of an inert gas such as nitrogen or argon. There is no need at all to use a liquid diluent in the co-pulverization treatment, and the use of it is often undesirable.

In the present invention, a catalyst composed of the component copulverized in the manner described and an organoaluminum or organozinc compound is used. As the organometallic compound, the following can be cited, for instance, trialkyl aluminums having an alkyl group with one to six carbon atoms, dialkyl aluminum halides having an alkyl group with one to six carbon atoms, dialkyl aluminum alkoxides where in the alkyl group has one to six carbon atoms and the alkoxy group having one to four carbon atoms, alkyl aluminum alkoxy halides wherein the alkyl group has one to six carbon atoms and the alkoxy group has one to four carbon atoms, and dialkylzincs having an alkyl group with one to four carbon atoms. Specific examples include triethyl aluminum, tributyl aluminum, trihexyl aluminum, triisobutyl aluminum, diethyl aluminum chloride, diethyl aluminum bromide, diethyl aluminum ethoxide, and ethyl aluminum ethoxychloride. One can also employ the reaction products of alkyl aluminum dihalides or alkyl aluminum sesquihalides with electron donors such as phosphines, ethers and esters, the reaction products of said alkyl aluminum halides with fluoro-complexes containing an alkali metal of Group 4 of the periodic table such as alkali metal titanium fluoride, or the reaction products of said reaction products with alkenyl monoethers.

The process of the invention is suited particularly for the polymerization or copolymerization of $\alpha$-olefins having three to eight carbon atoms or the copolymerization of such $\alpha$-olefins with ethylene in an inert solvent or liquid $\alpha$-olefin. Examples of such $\alpha$-olefins include propylene, 1-butene, 4-methyl-1-pentene, and 1-hexene. Specifically, the process is used conveniently for the production of homopolymers of propylene, 1-butene, 4-methyl-1-pentene and 1-hexene, and copolymers of propylene, 1-hexene, or 4-methyl-1-pentene with ethylene or 1-butene. For obtaining a highly crystalline copolymer from ethylene and propylene, it is necessary to adjust the ethylene content of the resulting copolymer to 30 mol percent or less.

The process of the present invention can be performed in the same way as in the known polymerization or copolymerization of $\alpha$-olefins using a Ziegler catalyst in an inert solvent, such as an inert hydrocarbon solvent or liquified $\alpha$-olefin, preferably hexane or liquefied propylene.

For example, the polymerization can be performed by putting the copulverized solid catalyst component prepared above and an organoaluminum or organozinc compound in a suitable inert hydrocarbon solvent such as hexene, heptane or kerosene, or liquefied $\alpha$-olefin in a condition substantially free from catalyst poison such as oxygen or water, and then introducing an $\alpha$-olefin thereinto. The polymerization that can be generally used ranges from 20° to 250°C. or so, preferably 40° to 150°C. The polymerization pressure is from atmospheric pressure to about 100 Kg.cm$^2$–g, preferably 2 to 60 Kg/cm$^2$–g. The concentration of the copulverized fine solid catalyst component is suitably from 0.005 to 10 g per liter of the solvent, and the concentration of the organo-metallic compound is preferably from 0.01 to 50 m-mols per liter of the solvent.

The molecular weight adjustment of the $\alpha$-olefin polymer can be effected by changing the polymerization temperature, the combination of the catalyst components and the molar ratios of the catalyst components, but can effectively performed by adding hydrogen to the polymerization system. It is also possible to increase the yield and apparent density of the polymer by adding silicon oil, esters, etc. to the polymerization system.

According to the process of the present invention, highly stereoregular polymers or copolymers of $C_3$–$C_8$ $\alpha$-olefins or copolymers of such $\alpha$-olefins with ethylene can be obtained with high specific polymerization activity.

The present invention will be described below further with reference to working examples together with several comparative examples, all of which are in no way intended to limit the invention.

In the following examples, the halogen compound of low valency titanium and the inorganic oxide were copulverized in the solid phase under the following standard conditions unless otherwise specified.

A 400 ml. stainless or porcelain cylindrical ball mill having an inner diameter of 10 cm was used. The diameter each of stainless or porcelain balls used was 10 to 20 mm, and the total volume of all balls was 100 ml. The inorganic oxide and the halogen compound of low valency titanium were placed in the ball mill, and copulverized in the solid phase at room temperature at 100 rpm. The content of titanium atom in the resulting product was determined by polarography.

Unless otherwise specified, the polymerization was performed under the following standard conditions in all of the following examples.

A 2-liter stainless steel autoclave equipped with a stirrer having two blades was used. One liter of refined hexane, the halogen compound of low valency titanium copulverized as described above, and an organoaluminum or organozinc compound were fed into the autoclave, and after raising the temperature to 65°C., an olefin was introduced at a constant pressure of 7 Kg/cm$^2$ and polymerized for 3 hours. After completion of the polymerization, the polymer obtained was transferred to another vessel. Hexane was removed by distillation with steam, and the polymer was dried for 16 hours under vacuum at 80°C. The isotacticity index which is a measure for the stereoregularity of an α-olefin polymer was indicated as a residue of the polymer extracted for 24 hours with hot n-heptane.

The number average particle size of the inorganic oxide and the copulverized solid catalyst prepared by using it was measured by using an optical microscope (product of Nippon Kogaku Kogyo Kabushiki Kaisha, Japan) with 70 magnifications. For convenience of operation, the material to be measured was suspended in kerosene.

EXAMPLE 1 AND COMPARATIVE EXAMPLES 1 TO 3

Silicon oxide (MS-ID gel; product of Fuji-Davison Chemical Ltd.) was dried for 2 hours at 200°C. in an atmosphere of nitrogen in a quarz tube. The dried silicon oxide had a specific surface area of 300 m$^2$/g and an average particle size of 50 μ. Eighty grams of the dried silicon oxide and 21 g of titanium trichloride (reduced with metallic aluminum; to be referred to AA hereinafter; product of Toho Titanium Company LTD.) were pulverized for 20 hours under the standard conditions in a ball mill. The catalyst contained 52.7 mg of titanium per gram thereof, and had an average particle size of 5 μ. Using 1,000 mg of this solid catalyst and 3 millimols of diethyl aluminum chloride, the polymerization of propylene was performed for 3 hours under the standard conditions. The yield of polypropylene was 94 g per milligram atom-of titanium, and it had an isotacticity index of 86 percent.

For comparative purposes, the procedure of the foregoing Example 1 was repeated except that a solid catalyst component having an average particle size of 20 μ was used with the shortened pulverization time (Comparative Example 1); the procedure of Example 1 was repeated except that silicon oxide and titanium trichloride were separately pulverized, and then mixed to form the solid catalyst component (Comparative Example 2); and the procedure of Example 1 was repeated except that only pulverized titanium trichloride was used with the ommission of silicon oxide (Comparative Example 1). The results obtained are given in the following Table 1.

TABLE 1

| Solid catalyst component (average particle size in μ) | Organo-metallic component | Polypropylene A[1] | B[2] | C[3] |
|---|---|---|---|---|
| Ex. 1 Copulverized product (5 μ) of SiO$_2$ and TiCl$_3$ (AA) | (C$_2$H$_5$)$_2$AlCl | 94 | 86 | 4.5 |
| Comp. Ex. 1 ditto (20 μ) | ditto | 68 | 90 | 3.2 |
| Comp. Ex. 2 Mixture (5 μ) of pulverized SiO$_2$ and pulverized TiCl$_3$ (AA) | ditto | 60 | 92 | 2.9 |
| Comp. Ex. 3 Pulverized TiCl$_3$ (AA) (5μ) | ditto | 64 | 90 | 3.0 |

[1]Yield in grams of polymer per milligram-atom of titanium.
[2]Isotacticity index.
[3]Specific polymerization activity.

EXAMPLE 2

Magnesium oxide (product of Kyowa Chemicals Co., Ltd., Japan) was put in a quarz tube, and calcined for 1 hour at 700°C. in an atmosphere of nitrogen. The calcined magnesium oxide had a specific surface area of 28 m$^2$/g and an average particle size of 20 μ. Forty-two grams of the dried magnesium oxide and 10 g of titanium trichloride (AA, product of Toho Titanium Co., Ltd., Japan) were pulverized for 20 hours under the standard conditions in a ball mill. The solid catalyst obtained had a titanium content of 53.2 mg per gram thereof, and an average particle size of 5 μ. Using 2,036 mg of the solid catalyst and 3 millimols of diethyl aluminum chloride, propylene was polymerized in one liter of hexane under the standard conditions for 3 hours. The yield of polypropylene was 90 g per milligram-atom of titanium, and the polypropylene had an isotacticity index of 88 percent.

For comparative purposes, the procedure of the foregoing Example 2 was repeated except that the solid catalyst component was used which had an average particle size of 5 μ and was prepared by mixing 1,000 mg of the calcined magnesium oxide above which was pulverized at room temperature for 20 hours at 120 rpm in a ball mill and 220 mg of titanium trichloride (AA) pulverized for 43 hours at room temperature at 120 rpm in a ball mill, together with 3 millimols of diethyl aluminum chloride (Comparative Example 4); and the procedure of Example 2 was repeated except that 100.6 mg of pulverized titanium trichloride (AA) was used (Comparative Example 5). The results obtained are given in Table 2.

TABLE 2

| Solid catalyst component (average particle size in μ) | Organo-metallic component | Polypropylene A[1] | B[2] | C[3] |
|---|---|---|---|---|
| Ex. 1 Copulverized product (5 μ) of MgO and TiCl$_3$ (AA) | (C$_2$H$_5$)$_2$AlCl | 90 | 88 | 4.3 |
| Comp. Ex. 4 Mixture (5 μ) of pulverized MgO and pul- | ditto | 60 | 91 | 2.9 |

| | | | verized TiCl$_3$(AA) | | | |
|---|---|---|---|---|---|---|
| Comp. Ex. 5 | | | | | | |
| | Pulverized TiCl$_3$(AA) (5 μ) | | ditto | 64 | 90 | 3.0 |

[1] Yield (q/mq-atom)
[2] I.I (%)
[3] Sp. Activity (q/mq-atom. hr. atom)

EXAMPLE 3

One liter of hexane was put into an autoclave, and the inside of the autoclave was purged with nitrogen. The solid catalyst component obtained by copulverization of titanium trichloride and magnesium oxide (prepared by the method of Example 1) (2050 mg), 3 millimols of diethyl aluminum chloride and 250 g of 4-methyl-1-pentene (purity 96 percent) were fed successively. The temperature was raised to 60°C., and the polymerization of 4-methyl-1-pentene was performed for 3 hours. The polymerization was stopped by addition of 40 ml. of methanol, and the resulting polymer was precipitated in 10 liters of methanol. After filtration, the cake was dried under vacuum for 15 hours at 80°C. to yield poly-4-methyl-1-pentene in an amount of 25 g per milligram atom of titanium. The polymer had an isotacticity index of 93 percent.

For comparative purposes, the procedure of the foregoing Example 3 was repeated except that 4-methyl-1-pentene was polymerized using 605 mg of pulverized titanium trichloride (prepared by the process of Comparative Example 4) and 3 millimols of diethyl aluminum chloride (Comparative Example 6). The results obtained are given in Table 3.

TABLE 3

| | Solid catalyst component (average particle size in μ) | Organo-metallic component | Poly-4-methyl-1-pentane A[1] B[1] C[1] |
|---|---|---|---|
| Ex. 3 | copulverized product (5μ) of MgO and TiCl$_3$(AA) | (C$_2$H$_5$)$_2$AlCl | 25  93  8.3 |
| Comp. Ex. 6 | pulverized TiCl$_3$(AA) (5 μ) | ditto | 13  95  4.3 |

[1] Yield (q/mq-atom)
[2] I.I. (%)
[3] Sp. activity (q/mq-atom. hr. atm.)

COMPARATIVE EXAMPLE 7

The inside of an autoclave was purged with nitrogen, then 1 liter of kerosene, 3 millimols of triisobutyl aluminum, and 200 mg of a solid catalyst component (prepared by the method of Example 2) by copulverization of magnesium oxide and titanium trichloride (AA) were put into the autoclave. Hydrogen was introduced to a partial pressure of 3.5 Kg/cm$^2$-g, and the temperature was raised to 90°C. The stirrer was rotated at a rate of 350 rpm. Ethylene was introduced continuously so that the total pressure was maintained always at about 7 Kg/cm$^2$-g, and subjected to suspension polymerization for 2 hours. The suspension of polymer obtained was thoroughly washed with hexane, and dried under vacuum for 15 hours at 80°C. to yield polyethylene. The polymer had an apparent density of 0.18 g/ml. and a specific polymerization activity of 69.3 g/milligram-atom of titanium.hr.atm.

COMPARATIVE EXAMPLE 8

Ethylene was polymerized in the same way as in Comparative Example 7 using 38 mg of titanium trichloride (AA) (product of Toho Titanium, Co. Ltd., Japan) and 3 m-mols of triisobutyl aluminum. The resulting polyethylene had an apparent density of 0.18 g/ml., a melt index of 0.2, and a specific polymerization activity of 71 g/mg-atom.hr.atm.

COMPARATIVE EXAMPLE 9

Fifty grams of commercial magnesium oxide (with a specific surface area of 40 m$^2$/g), which had been dried for 1 hour at 300°C., was dispersed in 300 ml. of kerosene, and 100 millimols of titanium tetrachloride were added. While the temperature was being maintained at 0°C. with stirring, 87 millimols of ethyl aluminum sesquichloride were added dropwise over a period of 1 hour. After completion of the addition, the mixture was heated to 40°C. and aged for 5 hours. After completion of the reaction, the resulting product was transferred onto a glass filter, washed throughly with dehydrated hexane, and dried to yield a red brown solid powder. Analysis indicated that 62.9 mg of titanium atom had been deposited per gram of this solid. Using 1,130 mg of the resulting solid catalyst, and 3 millimols of diethyl aluminum chloride, propylene was polymerized under the standard conditions. The resulting polymer was formed only in a trace amount.

EXAMPLES 4 to 7

Fifty grams of magnesium oxide (product of Kyowa Chemicals, Japan; specific surface area 40 m$^2$/g, average particle size 10 μ), which had been calcined for 2 hours at 600°C. in an atmosphere of nitrogen, were pre-treated with about 200 millimols of either triethyl aluminum, diethyl aluminum chloride, ethyl aluminum dichloride or diethylzinc in 200 ml. of kerosene for 3 hours at 110°C. with stirring. The pre-treated product was then washed with hexane, and dried. About 40 g each of these four kinds of magnesium oxides pre-treated with the organo-metallic compound and titanium trichloride (AA, product of Toho Titanium, Japan) were copulverized in a ball mill for 20 hours under the standard conditions. The solid catalyst component obtained had an average particle size of 0.5.

Using 1,000 mg of the solid catalyst component and 3 millimols of diethyl aluminum chloride, propylene was polymerized for 3 hours under the standard conditions to yield polypropylene.

The results obtained are given in Table 4.

TABLE 4

| Organo-metallic compounds used for pre-treat- | Amount of titanium in solid catalyst component | Polypropylene Yield per mg-atom of Ti (grams)  I.I. (%) | Specific activity (g/mg-atom Ti.hr.atm.) |
|---|---|---|---|

| Examples | ment | (mg/g-cat. comp.) | | | |
|---|---|---|---|---|---|
| 4 | $Et_3Al$ | 40 | 140 | 89 | 6.7 |
| 5 | $Et_2AlCl$ | 46 | 118 | 90 | 5.6 |
| 6 | $EtAlCl_2$ | 50 | 100 | 88 | 4.8 |
| 7 | $ET_2Zn$ | 45 | 133 | 89 | 6.3 |

Note: 'ET' stands for ethyl group.

COMPARATIVE EXAMPLE 10

Sixty-four grams of titanium trichloride (AA, product of Toho Titanium Co., Ltd., Japan) and 2.70 g of diethyl aluminum chloride were pulverized in a ball mill for 20 hours at room temperature employing the standard conditions described before. Using a catalyst composed of 418 mg of the resulting pulverized product having an average particle size of 2 $\mu$ and 3 millimols of diethyl aluminum chloride, propylene was polymerized for 3 hours under the standard conditions to yield polypropylene. The yield of polypropylene was 78 g per milligram-atom of titanium, and it had an isotacticity index of 91 percent and a specific polymerization activity of 3.7 g/mg-atom.Ti.hr.(Kg/cm$^2$).

EXAMPLE 8

Fifty grams of γ-aluminum oxide (product of Wako Pure Chemical, Industries, Ltd. Japan), which had been dried for 2 hours at 300°C. in an atmosphere of nitrogen were pretreated with 20 ml. of diethyl aluminum chloride in 200 ml. of kerosene for 3 hours with stirring. After completion of the treatment, the aluminum oxide was washed with hexane, and dried to yield a dried product having an average particle size of 15 $\mu$. Forty grams of the dried aluminum oxide obtained and 100 g of titanium trichloride (AA, product of Toho Titanium Co., Ltd., Japan) were mixed with each other, and pulverized in a ball mill for 20 hours under the standard conditions. The titanium content per gram of the solid catalyst component obtained was 47.0 mg, and the average particle size of the catalyst was 2 $\mu$. Using 2,005 mg of this solid catalyst component and 3 millimols of diethyl aluminum chloride, propylene was polymerized for 3 hours under the standard conditions to yield polypropylene. The yield of polypropylene was 135 g per milligram atom of titanium, and it had an isotacticity index of 91 percent and a specific polymerization activity of 6.4 g/mg-atom.hr.(Kg/cm$^2$).

EXAMPLE 9

Forty grams of silica gel obtained by pretreating 50 g of the dried silicon oxide of Example 1 with 100 millimols of triethyl aluminum in the same way as in Example 4, and 10.7 g of δ-titanium trichloride (AA, product of Toho Titanium Co., Ltd., Japan) were pulverized in a ball mill for 20 hours under the standard conditions. The titanium content per gram of the solid catalyst component was 41.6 mg, and its average particle size was 0.9 $\mu$. Using 2,018 mg of this solid catalyst and 3 millimols of diethyl aluminum chloride, propylene was polymerized for 3 hours under the standard conditions to yield polypropylene. The yield of polypropylene was 164 g per milligram atom of titanium, and it had an isotacticity index of 93 percent and a specific polymerization activity of 7.8 g/mg-atom Ti.hr.(Kg/cm$^2$).

COMPARATIVE EXAMPLE 11

Forty-five grams of a powdery product obtained by pretreating magnesium oxide (product of Kyowa Chemicals Co., Ltd., Japan) with a specific surface area of 52 m$^2$/g which had been obtained by drying for 3 hours at 180°C. in a tube in an atmosphere of nitrogen, with triethyl aluminum in the same way as in Example 4, and 4.7 g of δ-titanium trichloride (AA, product of Toho Titanium Co., Ltd., Japan) were mixed, and pulverized in a ball mill for 20 hours under the standard conditions. The titanium content per gram of the solid catalyst component was 29.1 mg, and its average particle size was 0.7 $\mu$. Using 985 mg of this solid catalyst component and 3 millimols of diethyl aluminum chloride, propylene was polymerized for 3 hours under the standard conditions. The yield of polypropylene was 3.6 per milligram-atom of titanium, and it had an isotacticity index of 63 percent and a specific polymerization activity of 1.7 g/mg-atom Ti.hr.(Kg/cm$^2$).

EXAMPLE 10

Using 3 millimols of diethyl aluminum chloride, and 2,005 mg of a solid catalyst component obtained in accordance with the procedure of Example 4 by copulverizing magnesium oxide pretreated with triethyl aluminum and titanium trichloride, 4-methyl-1-pentene was polymerized in the same way as set forth in Example 3 to form poly-4-methyl-1-pentene in an amount of 30 g per milligram-atom of titanium. The polymer obtained had an isotacticity index of 95 percent and a specific polymerization activity of 10.0 g/mg-atom Ti.hr.(Kg/cm$^2$).

EXAMPLE 11

One hundred grams of silicon oxide (MS-ID gel) dried under the conditions of Example 1 were suspended in 500 ml. of refined hexane, and were reacted with 50 millimols of triethyl aluminum under reflux for 3 hours, followed by filtration and drying. The pretreated silicon oxide (63 g) and 11.5 g of hydrogen-reduced titanium trichloride (product of Stauffer Chemical Corp.) were pulverized for 48 hours under the standard conditions. The titanium content per gram of the solid catalyst component obtained was 47.1 mg, and its average particle size was 0.8 $\mu$. Using 1,010 mg of this solid catalyst component and 3 millimols of diethyl aluminum chloride, propylene was polymerized for 3 hours under the standard conditions. Polypropylene was obtained in an amount of 90 g per milligram-atom of titanium, and the polymer had an isotacticity index of 85 percent.

COMPARATIVE EXAMPLE 12

The dried silicon oxide prepared in Example 2 was dispersed in 500 ml. of N$_2$-purged, dehydrated kerosene, with the addition of 250 millimols of TiCl$_4$. The dispersion was cooled to 0°C. Ethyl aluminum sesquichloride (250 millimols) was added dropwise with good stirring. After completion of the addition, the mixture was heated to 40°C., and aged for 3 hours. The resulting brown slurry was filtered in an atmosphere of nitrogen, washed with dry hexane, and dried. About 40 g of the resulting solid catalyst component were pulverized in a ball mill for 20 hours under the standard conditions. The titanium content of the solid catalyst component per gram thereof was 45.1 mg, and its average particle size was 3 $\mu$.

Using 1,010 mg of the solid catalyst component and 3 millimols of diethyl aluminum chloride, propylene was polymerized for 3 hours under the standard conditions to yield polypropylene in an amount of 51 g per milligram-atom of titanium, which had an isotacticity index of 58 percent.

EXAMPLE 12

Silica-alumina (product of Mizusawa Kagaku Kogyo Kabushiki Kaisha, Japan) containing 10 percent of silica component was predried for 3 hours at 400°C. in a quarz tube to form a dried product having a specific surface area of 350 m²/g.

One hundred grams of this dried product were treated with 150 millimols of triethyl aluminum in 100 ml. of kerosene for 2 hours at 80°C., followed by filtration, washing with hexane and drying. Fifty grams of silica-alumina so treated and 16 g of $TiCl_3$ (AA) were pulverized in a ball mill for 30 hours under the standard conditions. The titanium content of the resulting solid catalyst component was 56.8 mg per gram thereof, and the average particle size was 1 $\mu$.

Using 533 mg of the solid catalyst component and 3 millimols of diethyl aluminum chloride, propylene was polymerized for 3 hours under the standard conditions. The yield of polypropylene was 127 g per milligram-atom of titanium, and its isotacticity index was 93 percent.

EXAMPLE 13

A glass ampoule containing 1,000 mg of the titanium trichloride composition of Example 1 was placed in a 2-liter stainless autoclave equipped with an electromagnetically operated stirrer and capable of withstanding pressure up to 100 Kg/cm²G in such a way that the ampoule would be destroyed simultaneously with the rotation of the stirring rod and the contents fall into the autoclave. The inside of the autoclave was thoroughly purged with nitrogen. Diethylaluminum chloride (5 millimols) was added, and 460 g of liquid propylene and then hydrogen at 26 Kg/cm².G were introduced into the autoclave. The reaction mixture was heated to 60°C., and stirring was initiated. The ampoule was broken, and the polymerization began. The polymerization was continued for 1 hour at 60°C. After completion of the reaction, unreacted propylene was removed by flushing, and the catalyst was removed by decomposition with addition of methanol. The product was dried under reduced pressure to form 183 g of a polymer (which corresponded to 165 g per millimol of Ti). The polymer had an isotacticity index of 93 percent.

What is claimed is:

1. A process for polymerizing or copolymerizing $\alpha$-olefins having three to eight carbon atoms or copolymerizing said $\alpha$-olefins with ethylene in an inert solvent or a liquid $\alpha$-olefin in the presence of a Ziegler catalyst comprising i. a pulverulent catalyst component obtained by mechanically or physically copulverizing a solid halogen compound of low valency titanium obtained by reducing titanium tetrahalide with a member selected from the group consisting of hydrogen, metallic aluminum and metallic titanium, and at least one solid oxide selected from the group consisting of (a) an oxide selected frmm the group consisting of MgO, $Al_2O_3$ and $SiO_2$ and (b) a compound oxide containing at least two elements selected from the group consisting of Mg, Al and Si, in an inert atmosphere in the solid phase until the average particle size of the pulverized product reaches 5 to 0.1 $\mu$, the amount of said halogen compound of low valency titanium being in the range of 0.1–2.0 millimols per gram of said oxide; and ii. an organo-metallic compound selected from the group consisting of (a) a trialkyl aluminum having an alkyl group of one to six carbon atoms; (b) a dialkyl aluminum halide having an alkyl group with one to six carbon atoms; (c) a dialkyl aluminum alkoxide wherein the alkyl group has one to six carbon atoms and the alkoxy group has one to four carbon atoms; (d) an alkylaluminum alkoxy halide wherein the alkyl group has one to six carbon atoms and the alkoxy group has one to four carbon atoms; (e) a reaction product of an alkyl aluminum dihalide or an alkyl aluminum sesquihalide with an electron donor; (f) the reaction product of an alkyl aluminum dihalide or an alkyl aluminum sesquihalide with a fluoro-complex containing an alkali metal of Group IV of the Periodic Table; (g) the reaction product of reaction products (e) or (f) with an alkenyl monoether; and (h) a dialkyl-zinc having an alkyl group with one to four carbon atoms.

2. The process of claim 1, wherein said oxide has been pre-treated by contact with a compound selected from the group consisting of trialkyl aluminums having an alkyl group with one to six carbon atoms, dialkyl aluminum halides having an alkyl group with one to six carbon atoms, alkyl aluminum dihalides having an alkyl group with one to six carbon atoms, alkyl aluminum sesquihalides having an alkyl group with one to six carbon atoms, and dialkylzincs having an alkyl group with one to four carbon atoms.

3. The process of claim 1, wherein said $\alpha$-olefin having three to eight carbon atoms is selected from the group consisting of propylene, 1-butene, 4-methyl-1-pentene and 1-hexene.

4. The process of claim 1, wherein the polymerization or copolymerization is carried out at a temperature in the range of 20° to 250°C.

5. The process of claim 1, wherein the polymerization or copolymerization is carried out at a pressure ranging from atmospheric pressure to 100 Kg/cm²-g.

6. The process of claim 1, wherein the amount of said pulverulent component is in the range of 0.005 to 10 g per liter of said inert solvent or liquid $\alpha$-olefin.

7. The process of claim 1, wherein the amount of the organometallic component of the catalyst is in the range of 0.01 to 50 millimols per liter of said inert solvent or liquid $\alpha$-olefin.

8. The process of claim 1, wherein at least 80 percent of the pulverized particles have diameters within the range of 5 to 0.1 $\mu$.

* * * * *